C. BERG.
CULTIVATOR TOOTH.
APPLICATION FILED DEC. 6, 1913.
1,133,221. Patented Mar. 23, 1915.
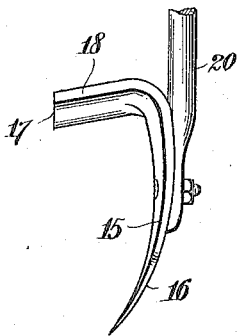
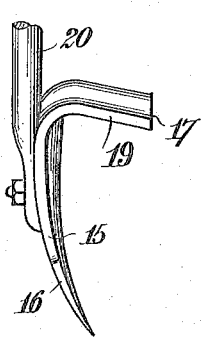
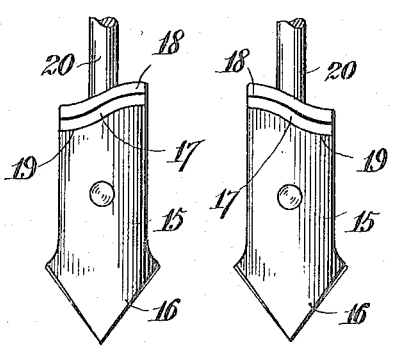
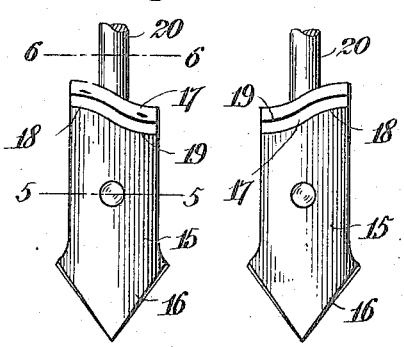
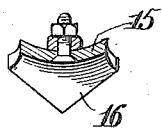
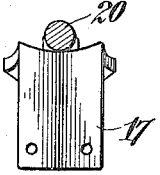
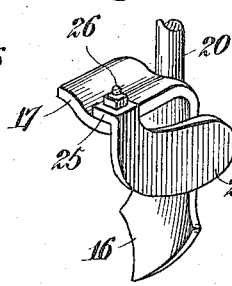
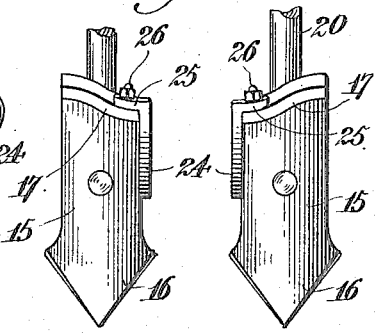
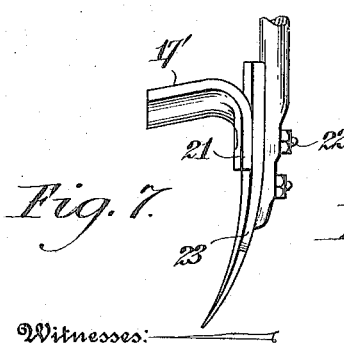
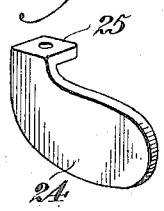
Inventor,
Carl Berg.
By Victor J. Evans,
Attorney.
Witnesses:

UNITED STATES PATENT OFFICE.

CARL BERG, OF BROOKLYN, NEW YORK, ASSIGNOR TO JAMES W. BEARD, OF NEW YORK, N. Y.

CULTIVATOR-TOOTH.

1,133,221.   Specification of Letters Patent.   Patented Mar. 23, 1915.

Application filed December 6, 1913. Serial No. 805,115.

*To all whom it may concern:*

Be it known that I, CARL BERG, a citizen of the United States, residing at Brooklyn, in the county of Kings and State of New York, have invented new and useful Improvements in Cultivator-Teeth, of which the following is a specification.

This invention relates to cultivator teeth, and it has for its object to produce cultivator teeth of simple and improved construction by the use of which the soil may be directed toward or away from the growing plants in a safe and efficacious manner, by simply interchanging the teeth from side to side.

A further object of the invention is to produce a cultivator tooth having an overhanging obliquely disposed flange serving to direct the soil.

A further object of the invention is to combine with a tooth having the aforesaid characteristics an auxiliary shield which may be advantageously used for cultivating very young and tender plants.

With these and other ends in view which will readily appear as the nature of the invention is better understood, the same consists in the improved construction and novel arrangement and combination of parts which will be hereinafter more fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side view of a cultivator tooth constructed in accordance with the invention. Fig. 2 is a side view of the same as seen from the opposite side. Fig. 3 is a front view of a pair of cultivator teeth constructed in accordance with the invention. Fig. 4 is a front view, showing the same pair of teeth, the relative position thereof being exchanged. Fig. 5 is a sectional detail view taken on the line 5—5 in Fig. 4. Fig. 6 is a sectional detail view taken on the line 6—6 in Fig. 4. Fig. 7 is a side view illustrating a modification. Fig. 8 is a perspective detail view illustrating a further modification, whereby a tooth is provided with auxiliary shields. Fig. 9 is a perspective detail view of one of the shields. Fig. 10 is a front view of a pair of cultivator teeth having the auxiliary shields.

Corresponding parts in the several figures are denoted by like characters of reference.

The body 15 of the improved cultivator tooth is of conventional shape, and it may be provided with what is generally known as a diamond point 16 or with an earth engaging point of any description. The body of the blade is also preferably arcuate in cross section, as will be best seen in Fig. 5. It will be understood, however, that I do not restrict myself with regard to the particular shape or character of the blade.

The body of the blade 15 is provided at its upper edge with a forwardly extending flange 17 which is obliquely disposed, that is to say, one side edge 18 of said flange is relatively high, and the other side edge 19 is relatively low. The teeth, as will be seen by reference to Figs. 3 and 4, are made "right" and "left," one being formed with a flange having the high side edge at the right side, while the other tooth is formed with a flange having the high side edge at the left side thereof. It follows that when the teeth are used in the position indicated in Fig. 3, the high side edges will be at the inner sides of the two teeth, while when the teeth are interchanged, as seen in Fig. 2, the high side edges will be at the outer sides of the teeth.

The teeth are bolted or otherwise mounted on standards 20 of ordinary conventional construction. It may be stated that when a gang of teeth are used, all but the two foremost teeth of the gang, may be of ordinary construction, that is to say, unprovided with the flanges 17.

Under the construction illustrated in Figs. 1 to 4, inclusive, and in Fig. 6, the flanges are formed or produced by bending forwardly the upper portions of the cultivator blades, said blades being made of special length for the purpose. Under the modified construction illustrated in Fig. 7, the flange portion, here designated 17′, is provided with a lug 21 for the passage of a fastening member, such as a bolt 22, whereby it is mounted in position on a cultivator blade 23 of ordinary construction.

In Figs. 8, 9 and 10 I have illustrated an oval-shaped auxiliary shield 24, the same being provided with a laterally extending lug 25 for the passage of a fastening member 26, whereby it is securely mounted on the forwardly extending flange 17 or 17', as the case may be. The auxiliary shield may be mounted adjacent to either the high or the low side of the flange, but always on the side adjacent to the row that is being operated upon, as seen in Fig. 10.

The forwardly projecting flange will, in operation, prevent clods of dirt and the like from jumping over the top of the blade and lighting on the young plants, thus protecting such plants from injury. The dirt that is stirred and agitated by the cultivator blades equipped with the improvement as it rises in front of the blade, will be intercepted by the obliquely disposed flange and moved inwardly toward the flanges or outwardly with respect to the flanges, according to the position of the blades. The auxiliary shields when used will enable very close cultivation to young and tender plants to be performed without danger to the plants. By the construction of the improved cultivator blades with the forwardly extending flanges, a larger portion of loose dirt may be moved toward or away from the plants than would otherwise be possible without the use of so-called fenders which are objectionable for many reasons, as is well known. The obliquely disposed flange in any event will prevent the dirt from being forced upwardly over the top edge of the cultivator blade and drop from thence to the ground, thereby endangering the young plants which are being operated upon, the dirt being rather thrown forwardly and to one side of the blade, where it will be caused to be deposited lightly adjacent to the young plants in a most efficient and desirable manner to insure the retention of a proper degree of moisture in the ground and to promote the vigorous growth of the plants.

Having thus described the invention, what is claimed as new, is:—

A cultivator blade having at its upper end an integral forwardly extending flange which is ogee shaped in edge elevation, one end of the flange being located at a greater distance from the lower end of the blade than the other end.

In testimony whereof I affix my signature in presence of two witnesses.

CARL BERG.

Witnesses:
 JOHN A. DONEGER,
 THEO. H. FRIEND.